Patented Apr. 23, 1946

2,398,899

UNITED STATES PATENT OFFICE 2,398,899

CATALYST

John W. Teter, Chicago, Ill., assignor to Sinclair Refining Company, New York, N. Y., a corporation of Maine No Drawing. Application May 22, 1942, Serial No. 444,097

5 Claims. (Cl. 252—207)

This invention relates to improved catalysts particularly effective in selectively promoting amination reactions, especially the amination of olefins by treatment with ammonia at elevated temperatures. More particularly the invention relates to a composite catalytic mass comprising a cobalt or nickel catalytic material dispersed in or suspended on a so-called carrier. The invention also includes a method by which these composite catalysts may be prepared.

Cobalt and nickel have previously been used as catalysts in various chemical processes. Their use in the form of a suspension on a carrier, for instance kieselguhr, has been suggested as a catalyst for hydrogenation reactions.

I have found cobalt and nickel to be particularly effective amination catalysts. However, I have discovered that the effectiveness as amination catalysts of suspensions of cobalt and nickel catalysts on so-called carriers, particularly their effectiveness in selectively promoting the amination of olefins by ammonia at elevated temperatures in the production of nitriles, is to a great extent dependent upon the characteristics of the so-called carrier.

The amination of olefins by treatment with ammonia in the presence of a catalyst, as described in the co-pending joint application of Frank A. Apgar and the present applicant, Serial No. 289,186, filed August 9, 1939, is favorably influenced by elevated temperatures. Unfortunately, undesirable side reactions such as cracking, polymerization and hydrogenation of the olefins are also promoted by elevated temperatures. By these undesirable side reactions the olefin reactant is dissipated and the organic nitrogen compound yields of the process materially reduced.

Some of the so-called carriers upon which it has been suggested that metallic catalysts be suspended in the preparation of catalytic masses appear themselves to be active catalysts of cracking, hydrogenation or polymerization reactions. Suspensions of cobalt or nickel on some of these carriers also appear to be active catalysts of these undesirable reactions. I have found that their presence in the amination reaction zone substantially promotes these competing side reactions.

It is an object of the present invention to provide an improved catalyst effective in promoting amination but which will retard or at least not materially promote competing side reactions such as previously mentioned.

The catalysts of my present invention combine both of these desirable characteristics, that is they are highly selective with respect to amination reactions. By their use in processes involving the amination of olefins at elevated temperatures, the extent to which these objectionable competing reactions occur is greatly reduced.

I cannot state with certainty whether the advantageous results obtained through the use of my improved catalysts in such amination processes are due to the characteristics of the carrier per se or whether they are due to the way in which the cobalt or nickel catalytic material is deposited thereon by reasons of the physical and chemical characteristics of the carrier. However, I have found that cobalt or nickel catalysts similarly prepared, except for the substitution of conventional carriers, are substantially less selective with respect to amination reactions than are the improved catalysts of my present invention.

I have also found that the effectiveness and selectivity of the catalyst prepared in accordance with my present invention are substantially influenced by the concentration of the cobalt or nickel catalytic material present in the catalytic mass.

Not only are my improved catalysts more selective in amination reactions but they possess improved characteristics with respect to retention of their selective catalytic properties and improved characteristics with respect to their susceptibility to regeneration and to pelleting and their ability to withstand conditions of use and regeneration without objectionable crushing or disintegration of the pelleted mass.

The various materials which have previously been used or suggested as carriers for catalysts differ widely as to their physical and chemical properties. Generally, their value has been attributed to their extensive surface areas.

From my comprehensive research concerning the use in amination reactions of metallic catalysts suspended on various carriers, it appears that the effectiveness of such catalytic masses is largely dependent upon some correlation of properties of the metallic catalyst and of the carrier, not fully understood. The complexity of the problem is apparent when it is appreciated that, in addition to surface areas and chemical composition, these carriers differ as to crystalline structure, particle size, shape, densities, porosity and the size, shape and type of their cavities.

I have found that the use of carriers characterized by maximum surface areas does not necessarily result in most effective amination catalysts. The surface area of composite catalytic masses comprising cobalt or nickel suspended on a carrier is often much greater than the surface area of the carrier itself, but appears to depend somewhat upon the surface area of the carrier. However, I have found that a composite catalytic mass comprising cobalt or nickel and having maximum surface area is not necessarily the most effective in amination reactions. The composite catalytic mass should be so constituted as to minimize the competing reactions while exerting maximum amination activity. The improved selectivity of the catalysts of my present invention appears to result from a unique combination of the characteristics of the metallic catalysts and of the carrier.

Since catalytic masses of the type described become less active after a period of use and require regeneration to restore their activity, the susceptibility of such catalysts to regenerative treatment is of major practical importance. I have found that the susceptibility of such catalytic masses to regeneration also depends to a considerable extent upon the characteristics of the carrier.

The material which I use as the carrier or support for the nickel or cobalt catalysts, in accordance with my present invention, is an especially treated bentonite clay. This material is prepared by modifying natural bentonite by treatment with sulfuric acid and thereafter subjecting the acid-treated bentonite to a severe heat-treatment. Typical of such acid-treated bentonite which I have used with advantage is that currently marketed under the tradename "Super-Filtrol," by the Filtrol Company of California, and shown by chemical analysis to have the following composition by weight:

| | Per cent |
|---|---|
| $Al_2O_3$ | 15.17 |
| $SiO_2$ | 58.80 |
| $TiO_2$ | 0.43 |
| $Fe_2O_3$ | 1.16 |
| CaO | 0.90 |
| MgO | 3.10 |
| $Na_2O+K_2O$ | 0.36 |
| $H_2O(3)$ | 12.1 |
| $H_2O$ (combined) | 6.3 |

The particle size of this acid-treated clay was as follows:

Mesh size:
| | |
|---|---|
| 60 and less | 0.00 |
| 60–100 | 0.10 |
| 100–200 | 14.34 |
| 200–300 | 13.82 |
| 300 up | 69.33 |

I have found such acid-treated bentonite to have a surface area of about 35 square meters per gram, as determined by the method hereinafter described. Its bulk density is usually approximately 35.25 lbs./cu. ft. If this acid-treated bentonite be used without further treatment as the carrier for cobalt or nickel catalytic material in the preparation of a catalytic mass for use in amination reactions, the resultant catalytic mass will be found to have excessive cracking and polymerization activity. Before using this acid-treated bentonite as the carrier in accordance with my invention, I subject it to a severe heat-treatment. This heat-treatment consists in heating the acid-treated bentonite to a temperature of about 1400° F.–1600° F. in a muffle furnace and holding it at this temperature for a period of about 8 hours. By this severe heat-treatment of the acid-treated bentonite, the activity of the catalytic mass prepared therewith in promoting cracking and polymerization is minimized. For example, the cracking activity of the catalytic mass prepared with the un-heat-treated clay has been found to be about 35% of that of a particular standard. By the preliminary heat-treatment of the clay, the cracking activity of the catalytic mass, on the same basis, is reduced to only about 5%.

During this heat-treatment, some agglomeration frequently occurs. It is therefore desirable to pass the heat-treated clay through a 90 mesh screen before use. By this preliminary heat-treatment, the surface area of the clay has been found to be reduced to approximately 20 square meters per gram.

The catalytic mass of my present invention, comprising cobalt, may with advantage be prepared as follows: A previously filtered aqueous solution of cobalt acetate tetrahydrate is thoroughly mixed with the clay, previously heat-treated as above described. An aqueous solution of a precipitant, for instance sodium carbonate, is then added. This sodium carbonate solution is added slowly, preferably in substantially equal parts with ½ to 1 hour stirring between additions. The final addition of the precipitant may with advantage be followed by 2 to 3 hours stirring after which the mass is allowed to settle overnight and is thereafter washed. The washing is advantageously effected by means of combined decantation and filtration, using distilled water, and is continued until only a trace of sodium ion appears in the wash water. The washed catalyst is then dried for 24 hours or longer in a steam chest. It is then ground, screened to about 8 mesh or upward and calcined at a temperature of 550° F. for about 24 hours in order to decompose the basic metal carbonates produced by the precipitation. The resulting product consists primarily of cobalt oxide supported by the clay plus a small amount of water of hydration and undecomposed carbonates.

The suspended cobalt compound is then reduced by passing hydrogen in contact with the mass at a temperature of 650–750° F. for a period of about 12 hours.

The catalytic mass may with advantage be pelleted prior to the reduction. If desired, a pelleting agent may be used to increase the crushing strength of the resultant pellet. However, the material may be pelleted without the aid of a binder.

The proportions of the metal salt and of the precipitant used will depend upon the desired concentration of the metallic catalyst with respect to the carrier. For example, in the preparation of a catalyst, in accordance with my invention, containing about 43% cobalt, 4240 grams (17 mols) of cobalt acetate tetrahydrate is dissolved in 10 gallons of distilled water and the solution filtered to remove any insoluble residue. 1000 grams of the heat-treated clay is then added to the cobalt solution and the mixture vigorously stirred for about an hour. 2200 grams (20.8 mols) of anhydrous sodium carbonate, dissolved in 4 gallons of distilled water, is then added as a precipitant, at such a rate that about half of the carbonate solution is added over the course of 1 hour, the solution stirred for a half hour and the remaining carbonate solution added in a similar manner. The resultant catalytic mass is then stirred for an hour or so longer and allowed to stand overnight before washing.

The catalyst is thereafter washed, for instance, by a filtration and stirring process. The thin slurry may be filtered and the filtercake reslurried in 10 gallons of distilled water, the slurry refiltered and so on until the sodium content of the catalyst has been reduced to a satisfactory level. A concentration of sodium in the wash water not in excess of 1 milligram per liter, when 10 gallons of wash water is used, is deemed satisfactory.

The wet catalyst is then placed in a steam chest and dried at a temperature of 250° F. for about 24 hours. The dried catalyst is then broken up into small lumps and calcined for about 24 hours at a temperature of 620° F. It is then ground and screened to pass a 30 mesh screen and, if desired, may be pelleted prior to reduction with hydrogen.

This material may readily be pelleted in the conventional manner without the use of a binder. However, where pellets of greater crushing strength are desired, binders may be used without substantial loss in the selective amination activity of the catalyst. For example, I have obtained very satisfactory results by the following method using rosin as a binder:

3% of a rosin of a particle size which will pass a 50 mesh screen, is intimately admixed with the finely divided catalyst by tumbling and stirring. The powdered material is then pelleted to form thin, hard pellets which are subsequently ground and screened. The resulting fine granular material, of a particle size between 30 and 50 mesh, is then repelleted, ground and screened as before. To the resultant granular material there is added an additional amount of rosin, for example about 1%, and the mixture repelleted.

These pellets are then dried in a stream of nitrogen for about 16 hours at a temperature of 700° F. The apparent density of the dried pellets prepared in this manner has been found to be about 1.25 grams per cubic centimeter and their crushing strength has been found to range from about 7 to about 23.5 pounds with an average crushing value of about 13.5 pounds.

After the drying operation the pellets may be reduced by treatment with hydrogen as previously indicated.

I have also obtained pellets of excellent characteristics and good crushing strength by substituting for the above-mentioned rosin powder about 4% starch and about 2% stearic acid as pelleting agents. Pellets prepared in this manner have been subjected to over 100 hours of use without evidence of disintegration.

The nickel catalyst of my invention may be prepared substantially as described above by substituting for the cobalt acetate a soluble nickel salt, for instance nickel nitrate hexahydrate. However, in preparing the nickel catalyst the calcining operation should be carried on at a temperature of about 660° F.

The concentrations of the metal catalyst in the composite catalytic mass may be varied over a considerable range but I have found concentrations of approximately 40 to 50% by weight to be most advantageous.

Generally, I have found my cobalt catalyst to be a more effective amination catalyst than my nickel catalyst of equal concentration. In most hydrogenation reactions, nickel has been found to be more active than cobalt. However, in pilot plant operations, the nickel catalyst prepared in accordance with the present invention has been found to effect only about 90% as much total organic nitrogen fixation as my cobalt catalyst of equal concentration. Also, when the nickel catalyst is used, there is a greater amount of cracking than occurs when the cobalt catalyst is used under similar operating conditions. Though less effective than cobalt as an amination catalyst, I have found the nickel catalyst of my invention to be far superior as an amination catalyst to catalytic masses comprising other reducible metals previously found effective as hydrogenation catalysts.

From these facts it is apparent that the ability of a catalyst to activate the N—H bond of ammonia is entirely unpredictable on the basis of the ability of such catalyst to activate the H—H bond of molecular hydrogen for hydrogenation. The two are not equivalent nor should they be expected to be equivalent when the differences in bond distance and dissociation energy of the N—H bond and the H—H bond are considered.

For the purposes of further illustrating the importance of the characteristics of the carrier used in the preparation of amination catalysts, I have tabulated below amination activities of various similarly prepared catalytic masses comprising approximately 50% cobalt suspended on various carriers. These activity values represent total organic nitrogen fixation, calculated as laurylamine, obtained by reacting ammonia with dodecene at a temperature of 550° F., and a pressure of 2000 pounds per square inch in the presence of cobalt catalysts prepared with the carriers indicated, other conditions being comparable. Under these specified conditions the cobalt catalyst of my present invention has an amination activity of about 12.

| Carrier | Amination activity |
|---|---|
| Pumice | 9.1 |
| Kieselguhr (ordinary type) | 8.6 |
| Alumina | 7.3 |
| Firebrick | 6.6 |
| Iron oxide | 5.3 |
| Aluminum fluoride | 2.1 |
| Aluminum silicate | 1.6 |

In addition to their superior amination activity, the catalysts of my present invention are superior to those prepared with the conventional carriers with respect to their activities in promoting competing reactions.

The effectiveness of my improved catalysts in amination reactions will be illustrated by the following specific examples of their use. In each instance the carrier was the heat-treated acid-modified bentonite previously described and the composite catalyst was prepared by the method heretofore related. The catalytic activity values were obtained in each instance from operations in which ammonia was reacted with propylene at a temperature of 700° F., and a pressure of 3000 pounds per square inch, and are expressed as the percentages of total organic nitrogen fixation calculated as propionitrile.

*Example I*

In this run the catalyst used was a 41% (by weight) suspension of cobalt, in the reduced form, on the heat-treated clay carrier, pelleted by the addition of 2% stearic acid and 4% starch. The surface area of the carrier or support in powdered form was 19.9 square meters per gram. The surface area of the composite pelleted catalyst, after reduction, was 23.4 square meters per gram. The porosity of the pelleted catalyst expressed in volume percent was 59.3 and the average crushing strength of the unreduced pellets was 5.5 pounds. The weight percentage of total nitrogen compounds produced, based on the weight of propylene charged to the reaction, was 11.5% and the weight ratio of non-nitrogenous polymer produced to total nitrogen compounds produced was 0.58.

*Example II*

In this run the catalyst was a 48.5% (by weight) suspension of cobalt, in the reduced form, on the same heat-treated clay carrier, pelleted by the addition of 4% rosin. The surface area of the pelleted catalyst after reduction was 32.8 square meters per gram. The porosity of the pelleted catalyst was 50.6 and its average crushing strength of the unreduced pellets was 13.5 pounds. On the same basis, the total nitrogen compounds produced was 17% and the ratio of non-nitrogenous polymer to nitrogen compound was 0.32.

*Example III*

In this run a nickel catalyst was used comprising 46.1% nickel (by weight) suspended on the carrier previously described. The catalyst was used in pelleted form, no binder having been employed. The surface area of the reduced pellets was 48.5 square meters per gram, and their average crushing strength of the unreduced pellets was 4.8 pounds. On the basis of the propylene charge, the organic nitrogen compounds produced, calculated as propionitrile was 10.5% by weight and the ratio of polymer to propionitrile was 0.46.

In other tests carried out substantially as described above, using my improved cobalt catalyst comprising 50% cobalt, nitrogen compounds equivalent to over 25% by weight of the propylene charged to the process have been obtained.

It will be understood that the catalytic activity of my improved catalytic masses varies somewhat with the characteristics of the reactants and the temperatures, pressures and other operating conditions. Though the surface area is somewhat reduced by pelleting, the effectiveness of the catalyst in selectively promoting amination is not thereby seriously impaired.

The surface area values given herein are based on the amount of stearic acid adsorbed by the material from a benzene solution and the general assumption that the entire surface of the material is covered with a mono-molecular layer of stearic acid in such a state of orientation and packing that each molecule occupies about 20Å$^2$, as has been previously discussed rather generally in the literature. Briefly, the apparatus employed consists of a catalyst-adsorption tube having an upper and lower compartment and adapted to be evacuated and heated. A sample of the material, the surface area of which is to be measured, usually a 2 to 3 gram sample, is weighed out and transferred to the lower compartment of the adsorption tube. The tube is then weighed, heated and evacuated and the lower compartment sealed. For approximately 24 hours prior to sealing, the temperature is maintained slightly under 1000° F. and its pressure at 50–100 microns. An anhydrous solution of stearic acid in carefully purified benzene is then pipetted into the unsealed upper compartment of the tube and a thin partition separating the upper from the lower compartment of the tube broken. The stearic-benzene solution serves as a seal for the evacuated compartment of the tube until the solid material is well covered with the solution. The lower portion of the tube is then separated from the upper portion, tightly sealed and rotated end-over-end at a rate of about 80 R. P. M. for approximately 7 hours. It is then allowed to settle for 15 hours or more until the supernatant liquid is clear. Samples of the supernatant liquid are then removed and their stearic acid concentration compared with the concentration of the original solution. From these values the amount of stearic acid adsorbed by the solid material and the surface area of the solid material are then calculated.

The term "porosity" as used herein may be defined generally as the percentage of the total apparent volume of the material that is not occupied by the solid matter. The porosity values given were determined by the differential displacement in water and mercury, the displacements of the respective liquids being measured after the careful elimination of dissolved or occluded gases from the water and mercury and the evacuation of the material, the porosity of which was to be measured.

The catalysts of my present invention are with advantage used as a fixed bed through which an admixture of the reactants are passed or with which the reactants are otherwise brought into contact. In the process of this type I prefer to use the catalyst in a pelleted form. However, my improved catalysts are also applicable to amination processes of the type in which the catalyst in finely-divided form is passed continuously to the reaction zone in suspension in one of the reactants or a mixture thereof.

In either type of operation it eventually becomes necessary to regenerate the catalyst to restore its selective amination activity which gradually diminishes with continued use. This regeneration may readily be effected by periodically subjecting the degenerated catalyst to an atmosphere of hydrogen at a temperature of about 650–750° F. and at atmospheric pressure for about 12 to 50 hours.

I claim:

1. A catalytic mass selectively promoting amination of olefins in the presence of ammonia comprising a metal of the class consisting of cobalt and nickel in suspension on a carrier of acid-treated bentonite which subsequent to the acid-treatment but prior to the deposition of the metal thereon has been subjected to a temperature of about 1400° F. to 1600° F. for a period of about 6 to 8 hours.

2. A catalytic mass selectively promoting amination of olefins in the presence of ammonia comprising about 40%–50% by weight of a metal of the class consisting of cobalt and nickel in suspension on a carrier of acid-treated bentonite which subsequent to the acid-treatment but prior to the deposition of the metal thereon has been subjected to a temperature of about 1400° F. to 1600° F. for a period of about 6 to 8 hours.

3. A catalytic mass selectively promoting amination of olefins in the presence of ammonia comprising about 40%–50% by weight of cobalt in suspension on a carrier of acid-treated bentonite which subsequent to the acid-treatment but prior to the deposition of the metal thereon has been subjected to a temperature of about 1400° F. to 1600° F. for a period of about 6 to 8 hours.

4. A catalytic mass selectively promoting amination of olefins in the presence of ammonia comprising about 40%–50% by weight of nickel in suspension on a carrier of acid-treated bentonite which subsequent to the acid-treatment but prior to the deposition of the metal thereon has been subjected to a temperature of about 1400° F. to 1600° F. for a period of about 6 to 8 hours.

5. The method of producing a catalytic mass selectively promoting amination of an olefin in the presence of ammonia which comprises heating an acid-treated bentonite to a temperature of about 1400° F. to 1600° F. for a period of about 6 to 8 hours, precipitating thereon a compound of a metal of the class consisting of cobalt and nickel capable upon calcination of forming the oxide of the metal, calcining the mass to convert the metal compound to the metal oxide and reducing the oxide by subjecting the mass to an atmosphere of hydrogen at an elevated temperature.

JOHN W. TETER.